(12) United States Patent
Ciuca et al.

(10) Patent No.: US 7,503,370 B2
(45) Date of Patent: *Mar. 17, 2009

(54) CORDLESS BALANCED WINDOW COVERING

(75) Inventors: Zazu Ciuca, Jamestown, NC (US); Patrick Woods, Goshen, IN (US); Roger C. Palmer, Greensboro, NC (US); Bryan K. Ruggles, Salt Lake City, UT (US); Otto Kuhar, Garfield, NJ (US)

(73) Assignee: Newell Window Furnishings, Inc., Freeport, IL (US)

( * ) Notice: Subject to any disclaimer, the term of this patent is extended or adjusted under 35 U.S.C. 154(b) by 682 days.

This patent is subject to a terminal disclaimer.

(21) Appl. No.: 10/419,383

(22) Filed: Apr. 21, 2003

(65) Prior Publication Data

US 2003/0196765 A1 Oct. 23, 2003

Related U.S. Application Data

(60) Continuation of application No. 09/955,377, filed on Sep. 18, 2001, now Pat. No. 6,601,635, which is a division of application No. 09/450,109, filed on Nov. 29, 1999, now Pat. No. 6,330,899.

(60) Provisional application No. 60/126,410, filed on Mar. 26, 1999.

(51) Int. Cl.
*E06B 9/30* (2006.01)

(52) U.S. Cl. ........................ 160/170; 160/192

(58) Field of Classification Search ................ 160/170, 160/171, 168.1 R, 172 R, 191, 192, 193, 160/84.06, 84.04, DIG. 17, 168.1 P, 405; 267/155, 156; 185/37, 39, 40, 45

See application file for complete search history.

(56) References Cited

U.S. PATENT DOCUMENTS 13,251 A 7/1855 Bixler (Continued)

FOREIGN PATENT DOCUMENTS

DE 40 03 218 8/1991

(Continued)

OTHER PUBLICATIONS

Votta, Jr., F.A., "The Theory and Design of Long-Deflection Constant-Force Spring Elements," May 1952, pp. 439-450.

(Continued)

*Primary Examiner*—David Purol
(74) *Attorney, Agent, or Firm*—Marshall, Gerstein & Borun LLP

(57) ABSTRACT

Disclosed is a spring motor and control for use especially with window blinds. The motor comprises a storage drum having a first axis, an output drum mounted for rotation about a second axis parallel to and spaced from the first axis. A spring member is connected to and between the storage drum and the output drum to form a spring motor. The spring motor has laterally extending, spaced apart drum supports on opposite sides of the drums to support them for rotation. A coupled drive is connected to the storage and output drum whereby rotation of one of the drums in a first direction about its axis effects rotation of the other of the drums about its axis and in an opposite direction to cause winding and unwinding of the spring member between the drums. A drive actuator is connected to the coupled drive to effect rotation of the drums, and an adjustable friction member is engageable with one of the coupled drive and the drive actuator to adjustably alter the force necessary to effect movement of the coupled drive.

40 Claims, 5 Drawing Sheets

U.S. PATENT DOCUMENTS

| | | |
|---|---|---|
| 322,732 A | 7/1885 | Lang |
| 350,429 A | 10/1886 | Griswold |
| 842,401 A | 1/1907 | Goodell |
| 927,090 A | 7/1909 | Anderson |
| 948,239 A | 2/1910 | McManus |
| 1,636,601 A | 7/1927 | Givens |
| 1,669,255 A | 5/1928 | Landry |
| 1,721,501 A | 7/1929 | McKee |
| 1,731,124 A | 10/1929 | Carper |
| 1,789,655 A | 1/1931 | Iwata |
| 1,951,659 A | 3/1934 | Kesner |
| 2,037,393 A | 4/1936 | Roberts |
| 2,049,518 A | 8/1936 | Schier |
| 2,110,983 A | 3/1938 | Carver |
| 2,175,549 A | 10/1939 | Nardulli et al. |
| 2,250,106 A | 7/1941 | Lorentzen |
| 2,260,101 A | 10/1941 | De Falco |
| 2,266,160 A | 12/1941 | Burns |
| 2,276,716 A | 3/1942 | Cardona |
| 2,324,536 A | 7/1943 | Pratt |
| 2,325,992 A | 8/1943 | Wirthman |
| 2,350,094 A | 5/1944 | Butts |
| 2,390,826 A | 12/1945 | Cohn |
| 2,410,549 A | 11/1946 | Olson |
| 2,420,301 A | 5/1947 | Cusumano |
| 2,509,033 A | 5/1950 | Carver |
| 2,520,629 A | 8/1950 | Esposito |
| 2,535,751 A | 12/1950 | Nardulli |
| 2,598,887 A | 6/1952 | Burns |
| 2,603,285 A | 7/1952 | Caligari, Jr. |
| 2,609,193 A | 9/1952 | Foster |
| 2,687,769 A | 8/1954 | Gershuny |
| 2,824,608 A | 2/1958 | Etten |
| 2,874,612 A | 2/1959 | Luboshez |
| 3,141,497 A | 7/1964 | Griesser |
| 3,194,343 A | 7/1965 | Sindlinger |
| 3,358,612 A | 12/1967 | Bleuer |
| 3,371,700 A | 3/1968 | Romano |
| 3,485,285 A | 12/1969 | Anderle |
| 3,487,875 A | 1/1970 | Shukat et al. |
| 3,756,585 A | 9/1973 | Mihalcheon |
| 3,817,309 A | 6/1974 | Takazawa |
| 4,157,108 A | 6/1979 | Donofrio |
| 4,202,395 A * | 5/1980 | Heck et al. ............... 160/84.06 |
| 4,205,816 A | 6/1980 | Yu |
| 4,223,714 A | 9/1980 | Weinreich et al. |
| 4,254,814 A | 3/1981 | Vecchiarelli |
| 4,326,577 A | 4/1982 | Tse |
| 4,344,474 A | 8/1982 | Berman |
| 4,398,585 A | 8/1983 | Marlow |
| 4,487,243 A | 12/1984 | Debs |
| 4,574,864 A | 3/1986 | Tse |
| 4,610,292 A | 9/1986 | Hausmann et al. |
| 4,623,012 A | 11/1986 | Rude et al. |
| 4,625,786 A | 12/1986 | Carter et al. |
| 4,631,217 A | 12/1986 | Anderson |
| 4,647,488 A | 3/1987 | Schnebly et al. |
| 4,671,557 A * | 6/1987 | Lemp ..................... 296/37.16 |
| 4,687,038 A * | 8/1987 | Clemente ................ 160/84.06 |
| 4,726,410 A | 2/1988 | Fresh |
| 4,744,403 A * | 5/1988 | Hausmann et al. .......... 160/272 |
| 4,776,381 A | 10/1988 | Riddiford |
| 4,850,414 A * | 7/1989 | Lessard ................... 160/84.02 |
| 4,852,627 A | 8/1989 | Peterson et al. |
| 4,856,574 A | 8/1989 | Minami et al. |
| 4,862,941 A | 9/1989 | Colson |
| 4,877,075 A | 10/1989 | Markowitz |
| 4,880,045 A | 11/1989 | Stahler |
| 4,886,102 A | 12/1989 | Debs |
| 4,913,214 A | 4/1990 | Ming |
| 4,955,421 A | 9/1990 | Torti |
| 4,984,617 A | 1/1991 | Corey |
| 5,054,162 A | 10/1991 | Rogers |
| 5,060,709 A | 10/1991 | Simon |
| 5,067,541 A | 11/1991 | Coslett |
| 5,083,598 A | 1/1992 | Schon |
| 5,103,888 A | 4/1992 | Nakamura |
| 5,105,867 A | 4/1992 | Coslett |
| 5,133,399 A | 7/1992 | Hiller et al. |
| 5,141,041 A | 8/1992 | Katz et al. |
| 5,157,808 A | 10/1992 | Sterner, Jr. |
| 5,170,830 A | 12/1992 | Coslett |
| 5,184,660 A | 2/1993 | Jelic |
| 5,194,310 A | 3/1993 | Lenderink |
| 5,228,491 A | 7/1993 | Rude et al. |
| 5,274,357 A | 12/1993 | Riordan |
| 5,285,838 A | 2/1994 | Rapp et al. |
| 5,297,608 A | 3/1994 | Rap |
| 5,313,998 A | 5/1994 | Colson et al. |
| 5,316,066 A | 5/1994 | Rapp et al. |
| 5,318,090 A | 6/1994 | Chen |
| 5,320,154 A | 6/1994 | Colson et al. |
| 5,363,898 A | 11/1994 | Sprague |
| 5,391,967 A | 2/1995 | Domel et al. |
| 5,413,161 A | 5/1995 | Corazzini |
| 5,467,808 A | 11/1995 | Bell |
| 5,476,132 A | 12/1995 | Jacobson |
| 5,477,904 A | 12/1995 | Yang |
| 5,482,100 A | 1/1996 | Kuhar |
| 5,482,105 A | 1/1996 | Rude |
| 5,485,875 A | 1/1996 | Genova |
| 5,531,257 A | 7/1996 | Kuhar |
| 5,533,559 A | 7/1996 | Judkins |
| 5,538,066 A | 7/1996 | Liu |
| 5,623,982 A | 4/1997 | Okazaki |
| 5,655,590 A | 8/1997 | Bryant |
| 5,664,614 A | 9/1997 | Debs |
| 5,671,793 A | 9/1997 | Lee |
| 5,706,876 A | 1/1998 | Lysyj |
| 5,787,953 A | 8/1998 | Jacobson |
| 5,813,447 A | 9/1998 | Lysyj |
| 5,853,040 A | 12/1998 | Benthin |
| 5,855,235 A | 1/1999 | Colson et al. |
| 5,906,232 A | 5/1999 | Bauer et al. |
| 5,960,846 A | 10/1999 | Lysyj |
| 6,003,584 A | 12/1999 | Weinreich |
| 6,012,506 A | 1/2000 | Wang et al. |
| 6,015,002 A | 1/2000 | Biro et al. |
| 6,024,154 A | 2/2000 | Wang et al. |
| 6,029,734 A | 2/2000 | Wang et al. |
| 6,032,716 A | 3/2000 | Mattey |
| 6,047,759 A | 4/2000 | Lysyj |
| 6,056,036 A | 5/2000 | Todd et al. |
| 6,079,471 A | 6/2000 | Kuhar |
| 6,095,222 A | 8/2000 | Voss |
| 6,112,800 A | 9/2000 | Marusak |
| 6,116,320 A | 9/2000 | Peterson |
| 6,135,189 A | 10/2000 | Weinreich |
| 6,149,094 A | 11/2000 | Martin et al. |
| 6,153,283 A | 11/2000 | Pierson et al. |
| 6,192,964 B1 | 2/2001 | Cianci et al. |
| 6,227,279 B1 | 5/2001 | Belongia et al. |
| 6,234,236 B1 | 5/2001 | Kuhar |
| 6,283,192 B1 | 9/2001 | Toti |
| 6,289,965 B1 | 9/2001 | Ruggles |
| 6,293,329 B1 | 9/2001 | Toti |
| 6,330,899 B1 | 12/2001 | Ciuca et al. |
| 6,412,537 B1 | 7/2002 | Voss et al. |
| 6,474,394 B2 | 11/2002 | Kuhar |
| 6,491,084 B2 | 12/2002 | Voss et al. |
| 6,571,853 B1 | 6/2003 | Ciuca et al. |
| 6,601,635 B2 | 8/2003 | Ciuca et al. |
| 6,644,373 B2 | 11/2003 | Palmer |
| 6,644,375 B2 | 11/2003 | Palmer |

| | | | |
|---|---|---|---|
| 6,675,861 B2 | 1/2004 | Palmer et al. | |
| 6,684,930 B2 | 2/2004 | Palmer et al. | |
| 6,725,897 B2 | 4/2004 | Palmer | |
| 6,769,471 B2 | 8/2004 | Voss et al. | |
| 2002/0033240 A1 | 3/2002 | Toti | |
| 2002/0157796 A1 | 10/2002 | Judkins | |
| 2003/0024656 A1 | 2/2003 | Ciuca | |
| 2003/0111191 A1 | 6/2003 | Ciuca | |
| 2004/0177933 A1 | 9/2004 | Hillman | |

FOREIGN PATENT DOCUMENTS

| | | |
|---|---|---|
| EP | 1 039 092 | 9/2000 |
| FR | 883 709 | 7/1943 |
| FR | 2 337 809 | 8/1977 |
| GB | 13798 | 0/1893 |
| GB | 2 262 324 | 6/1993 |

OTHER PUBLICATIONS

U.S. Appl. No. 09/724,279, filed Nov. 28, 2000 and listing Michael D. Hillman, Evan T. Ward & Paul B. Specht as inventors (61 pages).

* cited by examiner

CORDLESS BALANCED WINDOW COVERING

CROSS REFERENCES TO RELATED APPLICATIONS

This application is a continuation of U.S. application Ser. No. 09/955,377, filed Sep. 18, 2001, now U.S. Pat. No. 6,601,635, issued Aug. 5, 2003, entitled "Cordless Balanced Window Covering," which is a divisional of U.S. application Ser. No. 09/450,109, filed Nov. 29, 1999, now U.S. Pat. No. 6,330,899, issued Dec. 18, 2001, entitled "Cordless Balanced Window Covering," which claims priority from Provisional Application Ser. No. 60/126,410, filed on Mar. 26, 1999, entitled "Cordless Balanced Window Covering," all of which are incorporated by reference herein. The following U.S. patents are cross-referenced and incorporated by reference herein: 1) U.S. application Ser. No. 09/229,111, filed on Jan. 12, 1999, now U.S. Pat. No. 6,412,537, issued Jul. 2, 2002, entitled "Cellular Lift Cord and Weight Adjustment Mechanism;" 2) U.S. application Ser. No. 08/629,896, filed Apr. 10, 1996, now U.S. Pat. No. 6,079,471, issued Jun. 27, 2000, entitled "Cordless Balanced Blind;" 3) U.S. application Ser. No. 08/303,773, filed Sep. 9, 1994, now U.S. Pat. No. 5,531,257, issued Jul. 2, 1996, entitled "Cordless Balanced Window Covering;" and 4) U.S. application Ser. No. 08/223,989, filed Apr. 6, 1994, now U.S. Pat. No. 5,482,100, issued Jan. 9, 1996, entitled "Cordless, Balanced Venetian Blind or Shade With Consistent Variable Force Spring Motor."

BACKGROUND OF THE INVENTION

1. Field of the Invention

The present invention relates generally to the art of spring motors useful for a variety of applications, including venetian blinds and window shades. More specifically the present invention relates to a system in which lifting cords and cord mechanisms are eliminated from shades or blinds. More specifically the invention relates to window covering systems which, inter alia, employ one or more spring motors to balance the weight of the accumulated window covering material, independent of the extent to which the blind or shade is raised or lowered. Even more specifically, the present invention utilizes an adjustable friction member for engagement with one of a coupled drive and drive actuator to permit the use of spring motors not requiring such rigid specifications.

2. Description of the Art

Venetian blinds have been known for many years and typically include a plurality of slats made from a variety of materials, such as metal, wood, plastic or other materials and supported by ladders.

Such blinds typically include a bottom rail or bar and some kind of tilt mechanism to enable the slats to move from a horizontal position to a nearly vertical position to open and close the blinds with respect to the passage of light. As is also conventional with such systems, flexible line members or lifting cords are coupled to the bottom rail, passing through the slats and into mechanisms within an upper headrail. The cords are employed to raise the bottom rail, accumulating individual slats as the bottom rail is raised. Because of gravity, the natural tendency of the bottom rail and accumulated slat weight is to free fall. In many instances in the prior art, locking mechanisms are employed to lock the bottom rail, and the slats stacked thereon at a height determined by the user. Pleated and other types of shades also include a bottom rail and include similar raising, lowering and line member or cord locking mechanisms.

Spring motors have operating characteristics which find particular utility in conjunction with assisting the elevating and lowering of a variable load such as that provided by venetian blind type window covering. Spring motors are well known in the art and conventionally comprise a flat ribbon of spring metal which is pre-stressed and coiled so as to have a natural or relaxed state in which the spring forms a tightly wound coil disposed on or in a spring storage or take up drum. The extended free end of the coil is attached to the hub of an output or spring drive drum onto which the spring is back-wound by rotating the output drum in a direction to back or reverse wind the spring thereon. When the load to which the output drum is connected is released, the curling property of the spring causes it to rewind onto or into the storage drum toward its natural or relaxed state. Such spring motors as described above can be of constant or variable force, depending upon the intended use of the motor. The characteristics of a variable force spring motor can be obtained in varying ways, but varying the radius of curvature of the spring member along the length thereof is conventionally the preferred method.

In connection with the use of such a spring motor and a venetian blind, as an example, a control drum or spool is mounted co-axially with the output drum for rotation therewith, and the flexible member or cord is wound onto the spool in a direction which provides for the unwinding of the cord to rotate the spring output drum in the direction for winding the spring member thereon from the spring storage drum. When the force necessary for such unwinding is relaxed, the spring member returns to its naturally coiled position whereby the spring output drum is rotated by the spring member in a direction to rewind the cord or belt onto the spool. In those blinds with locking mechanism, such rewinding of the cord onto the control drum is inhibited.

When raising or lowering a load such as the bottom rail and slats of a venetian blind, a pair of cords may be wound on the spool in opposite directions with the free ends of the cords attached adjacent the opposite ends of the bottom rail. Such a system is shown in U.S. Pat. No. 5,531,257 issued on Jul. 2, 1996 to Newell Operating Company of Freeport, Ill. When the bottom rail is lowered, the two cords unwind from the spool thus driving the spring output drum to wind the spring member thereon. Upward displacement of the bottom rail from a lowered position results in the spring member rewinding on the spring storage drum to rotate the spring output drum and thus the control drum in the direction to rewind the two cords. In elevating and lowering a suspended load of the foregoing example type, which is too heavy to provide desire displacement characteristics in connection with the upward and downward movement of the bottom rail, and using a single spring motor, many times it is necessary to provide a larger spring motor or operate two or more spring motors in tandem.

When it is desired, the spring motor may be designed to allow the balancing of the gravitational pull on the bottom rail and accumulated slats and the resisting force of the spring motor so that the weight, even though increasing, as additional slats are accumulated on the bottom rail as it is raised, the bottom rail may be released and stay at a predetermined height. However, this is difficult under all conditions.

Because of the differences in materials of the slats, the size of the blind, the number of slats in the blind, the weight of these parts plus the weight of the bottom rail, etc. motors must have different characteristics and be designed for different loads. It is difficult, if not impossible, to utilize the same motors on different types of the slatted blinds as well as shades or fabric covered blinds. The answer of course, heretofore, has been blinds with lifting locks for the cords, or various other means of providing for a balanced blind system. In some, for example U.S. Pat. No. 5,531,257, issued on Jul. 2, 1996 to Newell Operating Company, Freeport, Ill., utilize an electric motor to assist and to aid or facilitate the raising and lowering operations.

The motor of a type found in European Patent Application EP 0 796 994 A2 published on Sep. 24, 1997, is illustrative of a spring motor typically employed in a venetian blind system. Each of such motors are of necessity designed with different specifications to account for different loads due to different sizes, materials of the slats, and so forth.

SUMMARY OF THE INVENTION

The present invention features a cordless blind or shade in which a spring motor is used to eliminate conventional pull cord and cord-lock mechanisms, and which is suitable for encountering a wide variety of loads. This is accomplished in a weight suspension system including the spring motor for suspending a variable weight (e.g. the bottom rail and accumulated slats of a blind) connected thereto at any of a predetermined but variable height. A drive actuator is connected to the spring motor to effect motion to the weight, and an adjustable friction member engageable with one of the spring motor and the drive actuator adjustably alters the force necessary to effect motion of the weight connected to the spring motor.

The present invention also features a system in which an adjustable friction member engageable with at least one of a coupled drive and drive actuator for a spring motor allows for adjustment of the force necessary to affect movement or motion of the coupled drive. This feature allows for adjustment of the system friction (by adjustment of the adjustable friction member) so that a single spring motor design may be employed for a variety of window blinds and shades of differing sizes, and having differing bottom rail weights, and material composition. Of course a plurality of motors may be coupled in series so as to increase the spring force available for lifting heavier weight bottom rails and blind or slat material.

The manner in which the present invention accomplishes these features shall be described in the following detailed description of the most preferred embodiments, taken in conjunction with the figures which illustrate both a typical blind system and a spring motor adapted for utilization in a wide variety of blind systems. Generally, the foregoing features are accomplished in a blind or shade system by employing a constant force or consistently variable force spring motor employing an adjustable friction member. The features are accomplished, in a blind system, which includes a headrail, a bottom rail and window covering material located therebetween. The bottom rail, as is conventional, is moveable between a fully raised (or adjacent) and fully lowered (or remote) position with respect to the headrail and intermediate positions as desired by the user. A spring motor is preferably located in the headrail, which is, in use attached to the upper frame or exterior wall located adjacent to a window. (While it is preferable to locate the spring motor in the headrail, it may also be positioned in the bottom rail but the additional weight of the spring motor must be taken into account when the shade is being lifted, thus requiring a stronger spring motor to lift not only itself but accumulated slats or covering material as the bottom rail is elevated and approaches the top rail).

As will be shown hereinafter, the spring motor includes a line or cord member receiving (storage) spool. At least a pair of line members are coupled intermediate the bottom rail and the spool, the spring motor itself comprising a storage drum having a first axis and an output drum mounted for rotation about a second axis parallel to and spaced from the first axis. A spring member is connected to and between the storage drum and the output drum thereby forming the spring motor. The headrail includes laterally extending spaced apart side walls or drum supports on opposite sides of the drums to support them for rotation therebetween. A coupled drive (gears) is connected to the storage and the output drum so that rotation of one of the drums in a first direction about its axis affects rotation of the other of the drums about its axis, but in an opposite direction, to cause winding and unwinding of the spring member between the drums. A drive actuator which includes the spool, is connected to the coupled drive to effect rotation of the drums, and an adjustable friction member is mounted for engagement with one of the coupled drive and the drive actuator to adjustably alter the force necessary to affect movement of the coupled drive and the bottom rail by way of the line members. In this manner, when the load on the spring motor is at its highest, i.e., when the bottom rail and accumulated slats are closely adjacent the top rail, the friction member may be adjusted so as to effectively support such a load. It is recognized that the accumulated weight, in conjunction with the adjustment to the friction member, may also be adjusted, e.g. by altering the weight of the bottom rail. Such a scheme is disclosed in co-pending patent application Ser. No. 09/229,111, filed on Jan. 12, 1999 for "Cellular Lift Cord and Weight Adjustment Mechanism" to Voss et al. The end result is that the blinds and/or shades of the system may be manipulated by the operator or user to a balanced condition at a selected height by simply grasping the bottom rail and urging it in an upward or downward direction.

Still other features of the present invention include the possibility of adding friction enhancers, e.g. roughened or extra friction material or by trimming the friction or adjusting it by adding lubricants and the like.

Another feature of the present invention is the method of insuring, the retention of the bottom rail relative to the headrail at any point between a first adjacent position and a second remote position until a force is exerted sufficient to effect relative displacement therebetween. The method comprises the steps of applying a frictional force to at least one of the flexible line, line storage spool and spring motor to effect retention of the bottom rail relative to said headrail at the point when the force is removed. More specifically this is accomplished by insuring that the difference between the weight of the bottom rail plus slats or material, and the force applied to the weight is less than the frictional applied force.

Other features of the present invention will be described more completely in the following specification and claims taken in conjunction with the accompanying drawings in which:

DESCRIPTION OF THE PREFERRED EMBODIMENTS

Figure 1:
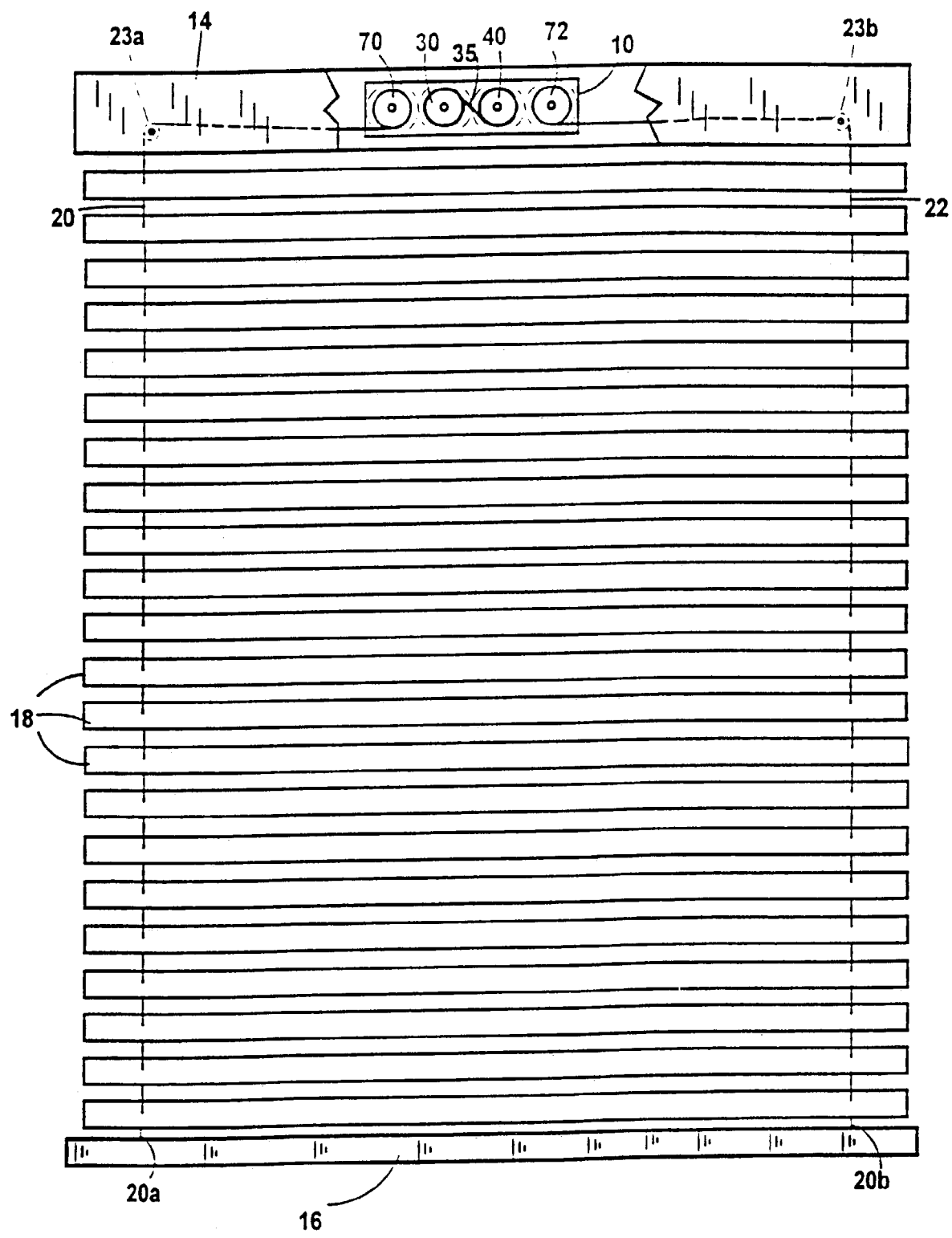
FIG. 1 is a schematic front elevational view, partially in fragment to illustrate the placement of a spring motor for operation in a venetian blind.

Referring now to the drawings, it is understood that the drawings are intended for illustration of the preferred embodiments of the invention and not for the purposes of limiting the invention. As illustrated, FIG. 1 schematically portrays a motor 10 operatively associated with a venetian blind unit 12 to provide a cordless arrangement for elevating and lowering the blind. As illustrated, the venetian blind unit 12 includes a headrail 14, a bottom or bottom rail 16, and a plurality of slats 18. As is known in the art, the slats 18 are independently supported from the headrail 14 as by flexible members or cords 20, 22 so as to be vertically spaced from one another when the bottom rail 16 is lowered, as shown in FIG. 1. The bottom rail 16 is connected to the terminal ends 20a, 20b of the cords 20, 22. When the bottom rail is elevated, the slats collectively stack upon one another and are supported by the bottom rail 16 when the latter is elevated to its retracted position beneath and closely adjacent the headrail 14. Motor 10 may be mounted in the headrail by any convenient means.

Figure 2:
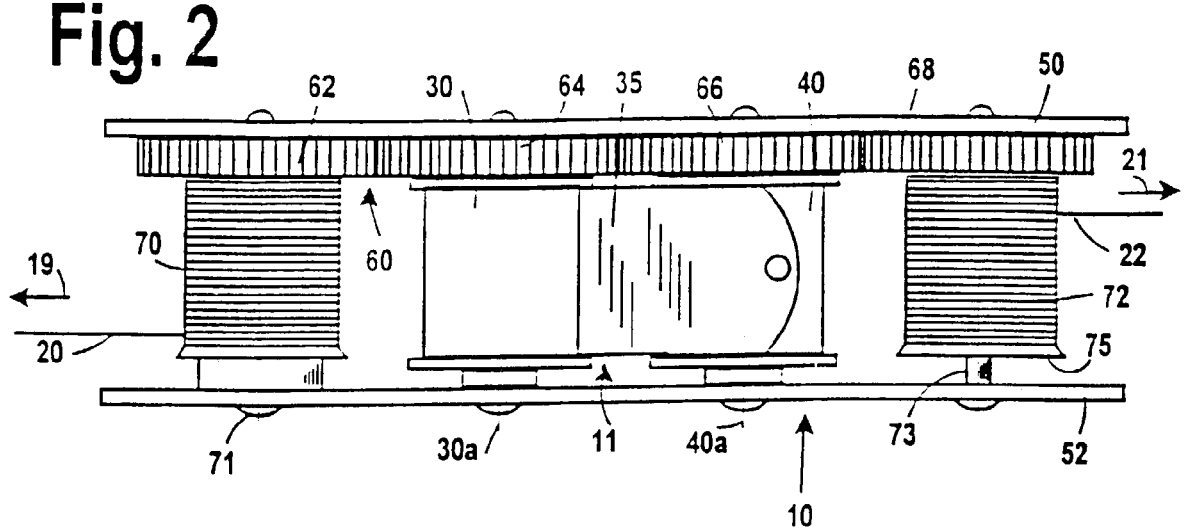
FIG. 2 is an enlarged fragmentary plan view of the motor shown in FIG. 1.

Referring now to FIG. 2, the motor 10 comprises a storage drum 30 having a first axis 30a and an output drum 40 mounted for rotation about a second axis 40a parallel to and spaced from the first axis 30a. A spring member 35 is connected to and between the storage drum 30 and the output drum 40 to form a spring motor 11. As illustrated, the spring motor 11 has or includes laterally extending, spaced apart drum supports or side walls 50, 52 on opposite sides of the drums 30 and 40 to support them for rotation therebetween. In the position shown in FIG. 2, the spring 35 is tightly wound on the storage drum 30 (and this corresponds to a condition where, as will be shown hereinafter, the bottom rail 16 lies closely adjacent the top rail 14 supporting the slats 18 on the bottom rail). A coupled drive 60, in the present instance comprising a plurality of gears 62, 64, 66, and 68, have the gears 64 and 66 connected respectively to the storage drum 30 and the output drum 40 of the spring motor 11. The coupling of the drive by the gears forces rotation of one of the drums 30, 40 in a first direction about its axis and the other of the drums in an opposite direction allowing winding and unwinding of the spring member 35 between the drums.

The coupled drive actuator comprises flexible member or cord storage spools 70 and 72, and are connected to the gears 62 and 68 respectively while being mounted for rotation by axles 71 and 73 of the spools 70 and 72. As shown, the flexible member or cord 22 is wound upon spool 72 while the flexible cord 20 is wound on the spool 70. Because the gears 62 and 68 form part of the coupled drive or drive train 60, it is easy to ascertain that if the cord 22 (relative to FIG. 2) is moving to the right, in the direction of arrow 21, then the cord 20 must be moving to the left in the direction of the arrow 19. This corresponds to a lowering of the blind. Again because of the coupled drive and coupled drive actuator 60, as the flexible member or cord 22 is pulled to the right, the spring member 35 starts winding on the output drum 40 and unwinding from the storage drum 30.

Figure 3:
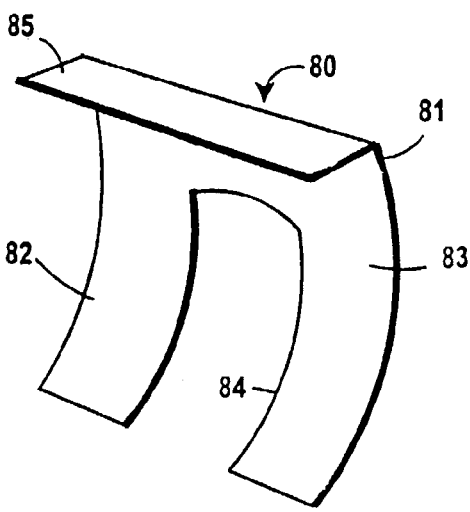
FIG. 3 is an enlarged perspective view of an adjustable friction member which is engageable in the spring motor to permit adjustment of the friction so as to allow the motor to be employed with various venetian blind and/or shade systems.
Figure 4:
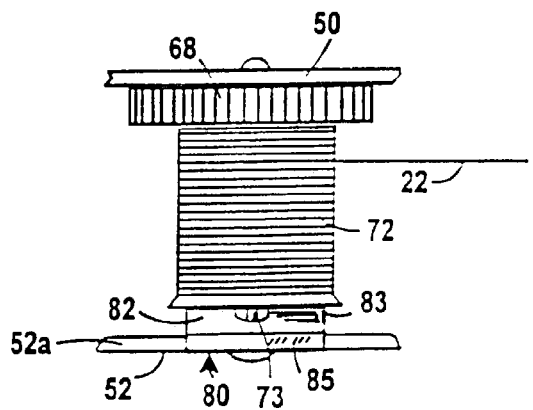
FIG. 4 is a fragmentary view in plan of a drive actuator utilizing the adjustable friction member illustrated in FIG. 3 to increase the friction on the motor and thus the drive.

In order to permit adjustment of the motor so as to accommodate varying loads, i.e., different size blinds or shades and different density materials, an adjustable friction member is provided for engagement with one of the coupled drive 60 and the drive actuator (or both, if desired) to adjustably alter the force necessary to affect movement of the coupled drive 60. To this end, and as best illustrated in FIG. 3, an adjustable friction member 80, for example, a bifurcated spring or shim like member 81, having spaced apart, outwardly curved or bowed legs 82 and 83 which define a slot 84 therebetween, is easily inserted intermediate the drum support or side wall 52 and one end 75 of the spool 72 (see FIG. 4). As shown, the slot 84 is dimensioned to allow clearance room between the shaft or axle 73 upon which the spool 72 is mounted for rotation. In this manner, the bowed legs 82 and 83 bear against the end 75 of the spool 72 and against the interior of the drum support or side wall 52. To permit the adjustable friction member 80 to be properly seated in the position as illustrated in FIG. 4, the member is provided with a lip like extension 85 which may be seated upon the edge 52a of the side wall or drum support 52. With the shim like construction of the adjustable friction member 80, the operator, when adjusting the motor for its intended load, may bend the legs 82, 83 of the shim so as to increase or decrease the pressure or frictional engagement between the shim 81 and the end 75 of the spool 72. In this manner, differing load force requirements may be accommodated quickly, inexpensively and with ease when the venetian blind or shade is being constructed.

Figure 5:
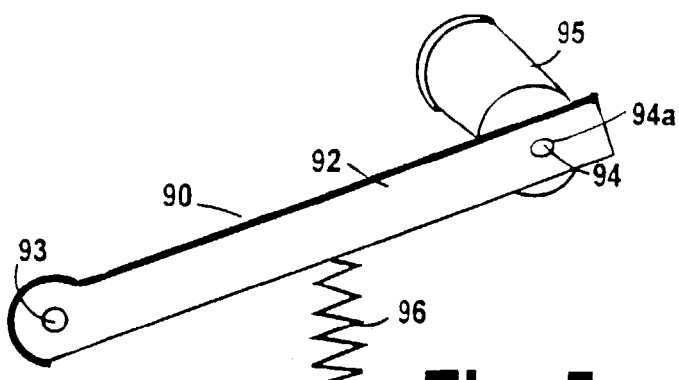
FIGS. 5 and 6 are another embodiment of an adjustable friction member that is also engageable with one of the coupled drive and drive actuators of the spring motor to adjustably alter the force necessary to affect movement of the coupled drive and the bottom rail in the venetian blind/shade system.
Figure 6:
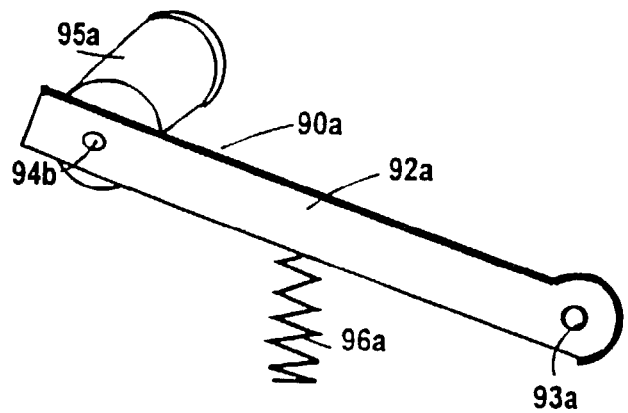
Figure 7:
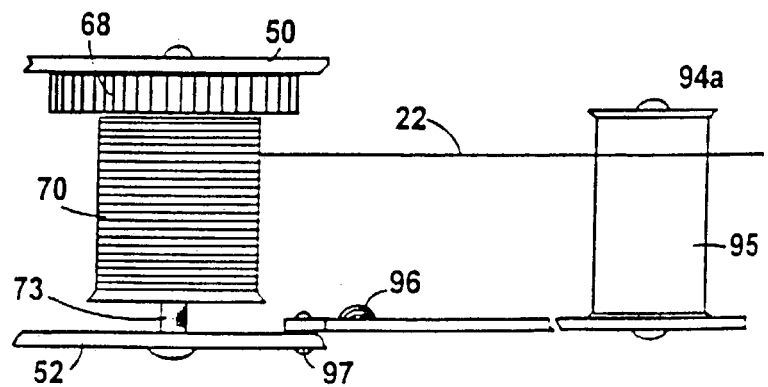
FIG. 7 is a plan view of a drive actuator employing the adjustable friction member illustrated in FIGS. 5 and 6.

Another embodiment of an adjustable friction member 90, constructed in accordance with the present invention, is illustrated in FIGS. 5-7. In this embodiment, an adjustable cord drag mechanism is utilized to adjust the cord friction. To this end and as illustrated, in FIG. 5, a biased arm or elongated bar 92, has an aperture and the like 93 at an enlarged bottom end and another aperture 94a for journaling a shaft 94 and the like upon which a spool 95 is mounted for rotation. A spring 96 is connected along the bar and biases, when abutting surface, such as the interior bottom of the top rail 14, to bias the bar 92 in a counterclockwise direction about the pivot aperture 93. As best illustrated in FIG. 7, the bar 92 is pivoted for rotation about a pivot pin 97 which allows the bar to pivot counterclockwise about the pin 97 when the bar is connected by the pin to one of the drum supports or side walls, for example and as shown in FIG. 7 the side wall 52. In the illustrated instance, the cord 22 passes over the spool 95, adding to the friction of the system. As may be ascertained from FIG. 7 as the tension on the cord 22 increases, the spring 96 will undergo compression causing the arm 90 or bar 92 to pivot about shaft 97 into a depressed condition. As the bottom rail is raised, and tension is decreased on the line cord 22, the bar will rotate counterclockwise about the pivot 93, decreasing the tension and the friction in the system. Thus the adjustable friction member 90 is dynamic in operation as opposed to the static operation of the shim 81.

It should be recognized that a mirror image of the arm of FIG. 5 may also be provided for operation in conjunction with the cord 20 on the spool 70 (see FIG. 2) by merely attaching the adjustable friction member 90a and biased bar 92a to one of the side walls or drum supports 50, 52. The accompanying spool 95a and axle 94b permit rotation of the spool 95a when the cord 20 is moving so as to unwind or wind cord 20 on and off the spool 70. In the preferred mode of this particular embodiment, it may be preferable to have both adjustable friction members 90 and 90a mounted to form a more balanced system, although the system will work with one or the other of the biased arms mounted on either of the drum supports or side walls 50, 52.

Figure 8:
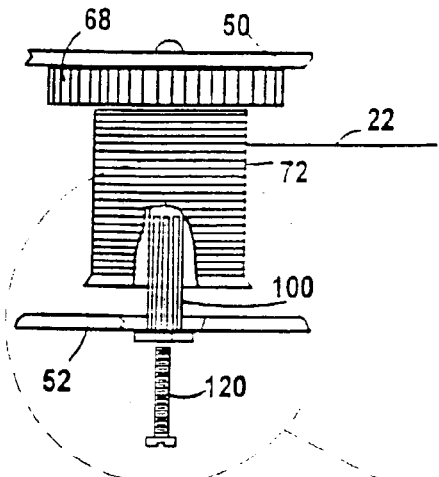
FIG. 8 is a fragmentary, schematic view in plan of another embodiment of an adjustable friction member constructed in accordance with the present invention.
Figure 9:
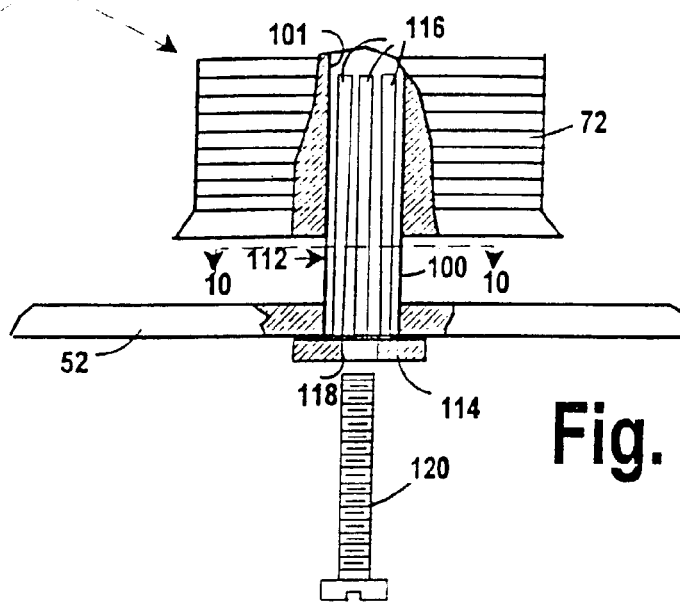
FIG. 9 is an enlarged view of the dashed line portion of FIG. 8, illustrating the embodiment in greater detail.
Figure 10:
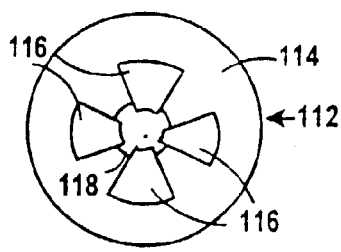
FIG. 10 is a fragmentary, sectional view taken along line 10-10 of FIG. 9.

In still another embodiment of the adjustable friction member an adjustable drag mechanism is employed for altering the force necessary for rotation of drums. Turning now to the embodiments illustrated in FIGS. 8-11, a radially adjustable core member permits adjustment of the friction opposing the rotation of, for example a spool or gear. As shown in FIGS. 2 and 7, and only by way of example, the axle 73, associated with spool 72, may be secured to the spool 72 and gear 50. By replacing the axle 73 with a tube 100, connected to the spool 72, and connecting the spool to the gear 68, a friction member may be placed interiorly of the tube. The adjustable friction member may take a variety of forms, such as illustrated best in FIGS. 8-10, and includes an insert 112 for placement interiorly of the tube 100. The insert 112 includes a bottom portion 114 and axially and longitudinally tapered legs 116. Coaxially of the bottom 114 and of the legs 116 is an aperture 118 adapted to receive a screw member 120, best illustrated in the cross section of FIG. 9. As the screw moves into the insert 112, the tapered legs 116 tend to radially spread so as to engage the interior surface 101 of the tube 100 thereby increasing the rotational friction tending to inhibit rotation of the spool 72, even when the force exerted on the cord 22, tending to displace or affect rotation of the spool, is increased due to, for example, an increase in the weight applied to the bottom rail.

Figure 11:
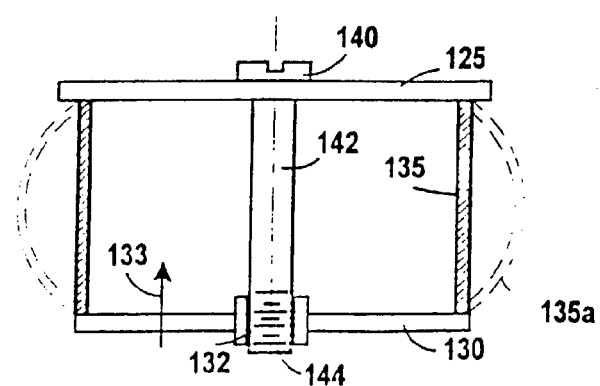
FIG. 11 is a fragmentary, sectional view of another embodiment of an adjustable friction member for use with the spool illustrated in FIG. 8.

In yet another embodiment of an adjustable friction member, a radially adjustable core member includes, and as illustrated in FIG. 11, a cylindrical insert 135 having an upper portion 125 and a spaced apart moveable or distal end portion 130 is connected as by a rubber or other expansible material cylinder 135 supporting the upper and distal end portions, 125 and 130 respectively.

A screw member 140 has a shank 142, and a threaded end portion 144, the screw portion engageable with a threaded nut like portion 132 in the distal end portion 130 of the insert. As shown in FIG. 11, as the screw is rotated in a first direction, the distal end 130 is pulled towards the upper or head portion 125 as in the direction of the arrow 133, causing the rubber cylinder 135 to expand (as shown in dashed lines 135a) into engagement with the interior of the tube 100. In this manner, the friction may be increased or decreased and adjusted dependent upon the force on the system or the cord 22. As may be readily understood, the inserts provided in FIGS. 8-11 may also be utilized with spool 70. Moreover, it should be understood that other inserts or other means of grasping, for example the axle 73 so as to allow for adjustment of the friction in the system may easily be employed to permit a number of different slats or blind arrangements to be used with a single spring motor.

It should also be recognized that since the force exerted by the spring motor should be able to support the load of the bottom rail and accumulated slats, with large loads (wide, heavy blinds) it may be desirable to couple motors together to increase the available spring force. To this end, a coupling scheme, such as shown and applied in "Cordless, Balanced venetian Blind or Shade With Consistent Variable Force Spring Motor" Ser. No. 08/223,989, Filed Apr. 6, 1994; now U.S. Pat. No. 5,482,100, issued Jan. 9, 1996, and herein incorporated by reference, may be employed, and is illustrated in FIG. 12.

Figure 12:
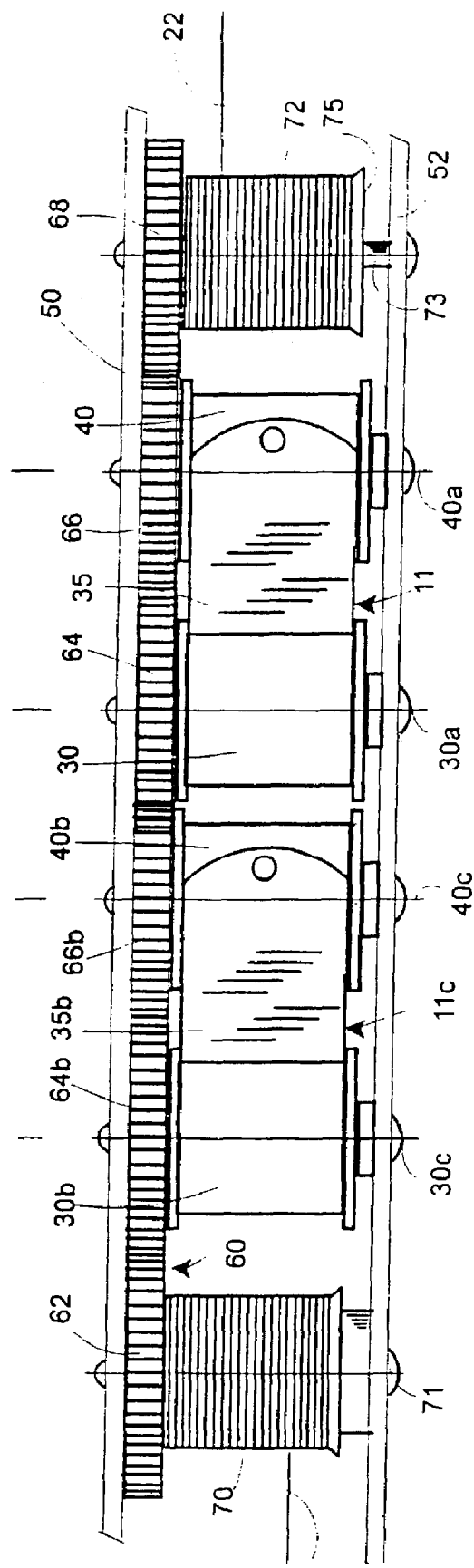
FIG. 12 is a fragmentary view in plan of an embodiment which may be employed with any of the forgoing adjustable friction members but in which motors are coupled in series to accommodate even greater weights due to the blinds or slats and the bottom rail.

Referring now to FIG. 12, an identical spring motor 11b is shown coupled to the motor 11, heretofore described. As shown, the spring motor 11b comprises a storage drum 30b having a first axis 30c and an output drum 40b mounted for rotation about a second axis 40c parallel to and spaced from the first axis 30c. A spring member 35b is connected to and between the storage drum 30b and the output drum 40b to form the spring motor 11b. As illustrated, the spring motor 11b, like the spring motor 11, includes the laterally extending, spaced apart drum supports or side walls 50, 52 on opposite sides of the drums 30b and 40b to support them for rotation therebetween. In the position shown in FIG. 12, the spring 35b is tightly wound on the storage drum 30b (and this corresponds to a condition the bottom rail 16 lies closely adjacent the top rail 14 supporting the slats 18 on the bottom rail). A coupled drive 60, in the present instance comprising a plurality of gears 62, 64b, 66b, 64, 66, and 68, have the gears 64b and 66b connected respectively to the storage drum 30b and the output drum 40b of the spring motor 11b. The coupling of the drive by the gears forces rotation of one of the drums 30b, 40b in a first direction about its axis and the other of the drums in an opposite direction allowing winding and unwinding of the spring member 35b between the drums.

Similar to the embodiment shown in FIG. 2, the coupled drive actuator 60 comprises flexible member or cord storage spools 70 and 72, and are connected to the gears 62 and 68 respectively while being mounted for rotation by axles 71 and 73 of the spools 70 and 72. As shown, the flexible member or cord 22 is wound upon spool 72 while the flexible cord 20 is wound on the spool 70. Because the gears 62 and 68 form part of the coupled drive or drive train 60, it is easy to ascertain that if the cord 22 (relative to FIG. 12) is moving to the right, then the cord 20 must be moving to the left. This corresponds to a lowering of the blind. Again because of the coupled drive and coupled drive actuator 60, as the flexible member or cord 22 is pulled to the right, the spring members 35 and 35b starts winding on the output drums 40 and 40c respectively, and unwinding from the storage drums 30 and 30b. It should be recognized that the adjustable friction devices or members disclosed heretofore, may also be applied to the structure of FIG. 12.

Of course it should also be recognized that there are numerous other ways to effect or alter the friction in a system, for example, a lubricant could be added between fixed and moveable parts. For example, a lubricant could be applied to the adjustable legs 82, 83 of the adjustable friction member 80 to decrease the friction of the legs against the end 75 of the spool 72 (see FIGS. 2-4). Alternatively, the width of the legs 82, 83 could be decreased (or increased for that matter) or made of different materials to decrease or increase the friction between the end 75 of the spool 72 and the adjustable friction member 80. Alternatively, the cords 20, 22 may be formed with a lubricant, e.g. a wax or the like to change the friction of the coupled drive actuator. By way of another example, consider the embodiment of FIGS. 5-7, the ability of the spools

95, 95a to rotate may be inhibited to increase the friction against the cords 22, 20. Alternatively, the cords or spools may be lubricated to decrease the friction. Moreover, rubbing or rolling surfaces may be roughened or applied with other friction enhancing material, e.g., embedded grit or sand, to allow for an increase in friction.

It is also recognized that inasmuch as the blind construction determines the weight encountered by the spring motor, the addition or removal of weight to the bottom rail 16 will change the amount of friction necessary in the system to achieve balance. Thus a combination of weight/friction adjustment, relative to the available spring force of the motor, will allow for proper balancing of the blind. This follows the fundamental equation, in this kind of blind system, where the frictional force must exceed the absolute value of the weight (bottom rail plus accumulated slats, if any, plus any other weight supported by the line cords) minus the spring force applied by the spring motor. Of course, as indicated above, the spring force may also be varied, by applying two or more coupled motors to accommodate an increase in weight and in order to achieve the desired balance while maintaining the force of friction the same.

The following equation sets forth the relationship between friction, load and spring force.

$$f > |\Sigma W - Sf|$$

Where
 $f$=Frictional Force
 $\Sigma W$=weight of bottom rail plus accumulated slats, plus any other supported weight at height of balance.
 $Sf$=force of the spring motor Thus the present invention features a cordless blind or shade in which a spring motor is used to eliminate conventional pull cord and cord lock mechanism and which is suitable for encountering a wide variety of loads making it unnecessary to design a specific motor for a specific end use. As shown, the system allows for an adjustable friction member engageable with one of a coupled drive and drive actuator for a spring motor so as to permit adjustment of the force necessary to affect movement of motion of the coupled drive. In this manner, adjustment of the adjustable friction member so that a single spring motor design (and under heavy loads or severe conditions even a coupled pair of spring motors) may be employed for a variety of uses such as window blinds and shades of differing sizes, weights and material composition, is facilitated.

What is claimed is:

1. A window covering of the type including a headrail, a bottom rail and window covering material located therebetween, the bottom rail being movable between a fully raised and a fully lowered position with respect to the headrail and being movable to intermediate positions therebetween, the window covering further including cord means coupled to the bottom rail and extending to the headrail for causing the bottom rail to be moved toward and away from the headrail, the improvement comprising:
 a spring motor including a cord spool;
 the cord means coupling the bottom rail to the cord spool;
 the spring of the spring motor being coupled to the cord spool to exert spring forces upon the spool as cord is wound therefrom and wound thereon, the spring being an elongate spring which moves from a first to a second spring storage drum and which is selected to have sufficient spring force to essentially balance the bottom rail against movement when the bottom rail is in any position; and
 a cord drag mechanism comprising:
  an elongated bar having a first end and a second end, wherein the first end is pivotally connected to the headrail,
  a drag spool pivotally connected to the second end of the elongated bar, and
  a drag spring engaging the elongated bar to bias the elongated bar to rotate in a first direction, wherein the cord means passes over the drag spool such that tension in the cord means caused by the weight of the bottom rail acts on the drag spool and tends to rotate the elongated bar in an opposite direction,
 the covering material being movable by an operator to a selected desired position by the operator urging the bottom rail upwards or downwards to a desired position, and the arrangement being such that the bottom rail remains in the selected desired position, and in which there is sufficient friction in the movable parts of the window covering that the effect of friction compensate for any imbalance between (i) the weight of the bottom rail and as much of the window covering material that is supported by the bottom rail at any particular extension of the window covering and (ii) the upwards force applied by the spring motor to the bottom rail at said particular extension, which upwards force (ii) essentially balances the weight (i) with the bottom rail in any position, but with friction completing the balance to avoid free-fall of the bottom rail or self-raising of the bottom rail.

2. A window covering according to claim 1, in which the spring is a constant force spring.

3. A window covering according to claim 1, in which the spring is a variable force spring.

4. A window covering according to claim 1, wherein means for imposing friction on the cord means is provided.

5. A window covering according to claim 4, wherein the means for imposing friction comprises at least one friction surface against which said cord means rubs when said cord means moves.

6. A window covering according to claim 5, in which the cord means approaches said friction surface extending in a first line and leaves said friction surface extending in a second, different, line, the cord means experiencing a change in direction at said friction surface.

7. A window covering according to claim 5, in which there are at least two friction surfaces.

8. A window covering according to claim 7, in which the cord means experiences a change of direction at a first friction surface and at a second friction surface.

9. A window covering according to claim 1, in which the cord means has a first portion extending away from the cord spool to one side of said spool and being in a rubbing contact with a first friction surface disposed to said one side of said spool, and a second portion extending to the other side of said cord spool, said second portion of said cord means contacting a second friction surface.

10. A window covering according to claim 9, in which said second portion also contacts a second friction surface.

11. A window covering according to claim 1, wherein friction increasing means is provided adapted to vary the frictional resistance to movement of the bottom rail.

12. A window covering according to claim 11, wherein the friction increasing components are such that a user can, in situo, select and vary the frictional resistance to movement of the bottom rail.

13. A window covering according to claim 1, comprising a plurality of spring motors, the plurality of motors being coupled together to act in unison.

14. A window covering according to claim 13, wherein each spring motor has a spring storage drum about which its spring extends, and in which the central axes of the spring storage drums are non-coincident, and spaced apart, and generally parallel and extend in a direction which is transverse to a line extending from the first spring storage drum to the second spring storage drum.

15. A window covering according to claim 13, in which a first spool of a first spring motor is coupled to a second spool of a second spring motor.

16. A window covering according to claim 15, in which the first and second spools are coupled together by a bar.

17. A window covering according to claim 15, in which the first and second spools are coupled together by a gear system.

18. A window covering according to claim 1, in which the spring force applied to the bottom member is just sufficient to prevent the bottom rail from self-raising against the force of gravity and friction.

19. The window covering according to claim 1, further comprising an electric motor coupled to the spring motor and adapted for selectively rotating the cord spool thereof.

20. A window covering comprising:
a top member for supporting a covering in a horizontal position, a bottom member, and a cord means extending between the bottom member and the top member for supporting the bottom member as it is moved toward and away from the top member, wherein the covering accumulates on and is supported by the bottom member as the bottom member is moved towards the top member;
at least one spring drive motor having a spring force, the at least one spring drive motor being coupled to the cord means; and
a cord drag mechanism comprising:
an elongated bar having a first end and a second end, wherein the first end is pivotally connected to the top member,
a drag spool pivotally connected to the second end of the elongated bar, and
a drag spring engaging the elongated bar to bias the elongated bar to rotate in a first direction, wherein the cord means passes over the drag spool such that tension in the cord means caused by the weight of the bottom rail acts on the drag spool and tends to rotate the elongated bar in an opposite direction, wherein friction imparted by the cord drag mechanism being sufficient, in co-operating with the spring force and with the weights of both the bottom member and accumulated window covering, to inhibit the bottom member from moving towards or away from the top member.

21. A window covering according to claim 20, comprising a plurality of the drive motors, the plurality of motors being couple together to act in unison.

22. A window covering according to claim 21, in which the drive motors each have an axis about which their springs extend and in which the axes are non-coincident, spaced apart, and generally parallel.

23. A window covering according to claim 20, wherein the spring drive motor includes a spring having a constant spring force.

24. A window covering according to claim 20, wherein the spring drive motor includes a spring having a spring force that varies as the bottom member is moved relative to the top member.

25. A window covering according to claim 20, including an enclosure for mounting said spring drive motor, and means coupling said cord means to said drive motor;
at least one passageway in said enclosure for allowing entrance and egress of said cord means to said means coupling said cord means to said drive motor.

26. A window covering according to claim 25, including a bracket extending from said enclosure, said bracket including at least one means defining an opening therein dimensioned to allow passage of said cord means therethrough and provide an engaging surface for said cord means.

27. A method for balancing a window covering including a top member for supporting the covering in a horizontal position, a bottom member, and a cord means extending between the bottom member and the top member for supporting the bottom member as it is moved towards and away from the top member, wherein the covering accumulates on and is supported by the bottom member as the bottom member is moved towards the top member, the method comprising:
(a) selecting a spring member having a predetermined spring force to bias the bottom member towards the top member;
(b) coupling the spring motor to the cord means;
(c) providing a cord drag mechanism comprising:
an elongated bar having a first end and a second end, wherein the first end is pivotally connected to the top member,
a drag spool pivotally connected to the second end of the elongated bar, and
a drag spring engaging the elongated bar to bias the elongated bar to rotate in a first direction, wherein the cord means passes over the drag spool such that tension in the cord means caused by the weight of the bottom member acts on the drag spool and tends to rotate the elongated bar in an opposite direction; and
(d) applying sufficient friction to inhibit the bottom member from moving towards or away from the top member.

28. A method according to claim 27, further including the step of selecting a bottom member having a given weight.

29. A method according to claim 28, wherein the step of selecting a spring motor having a predetermined spring force includes selecting a spring motor wherein the spring force increases as the bottom member is moved towards the top member.

30. A window covering of the type including a top member for supporting a window covering in a horizontal position and a bottom member, the window covering further including means including cord coupled to the bottom member and extending to the top member for causing the bottom member to be moved toward and away from the top member, the improvement comprising:
at least one consistent variable force spring drive motor for the window covering, said motor being coupled to the cord and wherein the spring drive motor comprises a coiled, elongate spring whose cross-section varies along its length between a first end thereof and a second end thereof; and
a cord drag mechanism comprising:
an elongated bar having a first end and a second end, wherein the first end is pivotally connected to the top member,
a drag spool pivotally connected to the second end of the elongated bar, and
a drag spring engaging the elongated bar to bias the elongated bar to rotate in a first direction, wherein the cord passes over the drag spool such that tension in the cord caused by the weight of the bottom member acts on the drag spool and tends to rotate the elongated bar in an opposite direction.

31. The window covering of claim 30, wherein the motor comprises a spring storage drum and a spring output drum and wherein the spring transfers from one drum onto the other as the bottom member is moved with respect to the top member.

32. The window covering of claim 31, wherein a cord storage spool is coupled to one of the drums to wind or unwind cord thereon as the bottom member is moved with respect to the top member.

33. The window covering of claim 30, further comprising means for imposing friction on the cord means as the bottom member is moved relative to the top member.

34. The window covering of claim 30, comprising a plurality of the drive motors, the plurality of motors being coupled together to act in unison.

35. The window covering of claim 30, wherein the spring varies in width from its first end to its second end.

36. The window covering of claim 30, wherein the spring varies in thickness form its first end to its second end.

37. The window covering of claim 30, wherein the spring is a constant force spring.

38. The window covering of claim 30, comprising more than one spring motor, at least one pull cord being coupled to the cord spool of each spring motor.

39. A window covering of the type including a headrail, a bottom rail and window covering material located therebetween, the bottom rail being movable between a fully raised and a fully lowered position with respect to the headrail and intermediate positions, the improvements comprising:

a spring motor located near the headrail and including a cord spool;

at least two cords coupling the bottom rail to the cord spool, the spring of the spring motor coupled to the cord spool to exert spring forces upon the spool as cord is wound therefrom and wound thereon, the spring being an elongate spring which moves from a first to a second spring storage drum and which is selected to have sufficient spring force to essentially balance the bottom rail against movement when the bottom rail is in any position; and a cord drag mechanism comprising:

an elongated bar having a first end and a second end, wherein the first end is pivotally connected to the headrail, a drag spool pivotally connected to the second end of the elongated bar, and a drag spring engaging the elongated bar to bias the elongated bar to rotate in a first direction, wherein one of the cords passes over the drag spool such that tension in the cord caused by the weight of the bottom rail acts on the drag spool and tends to rotate the elongated bar in an opposite direction.

40. The window covering of claim 39, further comprising an electric motor coupled to the spring motor and adapted for selectively rotating the cord spool thereof.

* * * * *

UNITED STATES PATENT AND TRADEMARK OFFICE
CERTIFICATE OF CORRECTION

PATENT NO. : 7,503,370 B2  Page 1 of 1
APPLICATION NO. : 10/419383
DATED : March 17, 2009
INVENTOR(S) : Zazu Ciuca et al.

It is certified that error appears in the above-identified patent and that said Letters Patent is hereby corrected as shown below:

At Column 11, line 46, "rail" should be -- member --.

At Column 11, line 56, "couple" should be -- coupled --.

Signed and Sealed this

Seventh Day of July, 2009

JOHN DOLL
*Acting Director of the United States Patent and Trademark Office*